United States Patent [19]

Kurosawa et al.

[11] Patent Number: 5,034,936
[45] Date of Patent: Jul. 23, 1991

[54] MULTI-DISK DISK PLAYER HAVING MINIMALLY-SIZED MAGAZINE DRIVE MOTOR

[75] Inventors: Atsushi Kurosawa; Toshiyuki Kimoto; Sei Onishi; Kiyohito Kajihara, all of Kawagoe, Japan

[73] Assignee: Pioneer Electronic Corporation, Tokyo, Japan

[21] Appl. No.: 480,459

[22] Filed: Feb. 15, 1990

[30] Foreign Application Priority Data

May 15, 1989 [JP] Japan .............................. 1-121166
May 22, 1989 [JP] Japan .............................. 1-128542

[51] Int. Cl.$^5$ .................. G11B 17/22; G11B 33/02
[52] U.S. Cl. ........................ 369/36; 369/34; 369/75.2; 369/77.2
[58] Field of Search .............. 369/34, 35, 36, 37, 369/38, 39, 77.1, 77.2, 75.2; 360/92

[56] References Cited

U.S. PATENT DOCUMENTS

| | | | |
|---|---|---|---|
| 4,561,078 | 12/1985 | Nakayama | 369/38 |
| 4,638,386 | 1/1987 | Takamatsu | 360/96.6 |
| 4,694,449 | 9/1987 | Einhaus | 369/246 |
| 4,730,291 | 3/1988 | Ikedo et al. | 369/39 X |
| 4,734,800 | 3/1988 | Suzuki | 360/96.5 |
| 4,878,138 | 10/1989 | Ando et al. | 360/99.02 |

FOREIGN PATENT DOCUMENTS

0163463 12/1985 European Pat. Off. .
0212244 3/1987 European Pat. Off. .
2221340 1/1990 United Kingdom .

OTHER PUBLICATIONS

Patent Abstracts of Japan 62-122050, P-768, Oct. 7, 1988, vol. 12, No. 377.
Patent Abstracts of Japan 62-295260, P-711, Jun. 2, 1988, vol. 12, No. 188.

*Primary Examiner*—Stuart S. Levy
*Assistant Examiner*—Kenneth B. Wells
*Attorney, Agent, or Firm*—Sughrue, Mion, Zinn, Macpeak & Seas

[57] ABSTRACT

Compensating arrangements compensate for variations in load which a disk magazine places on a drive motor. In a first arrangement, a cam slot of a predetermined spiral configuration receives driving force from a drive motor and translates the same to: an end-range force from an initial portion of the cam slot which causes the selected tray to rotate at a first speed; an intermediate-range force from a middle portion which causes the selected tray to rotate at a second speed which is higher than the first speed; and, an end-range force from a final portion which causes the selected tray portion to rotate at a third speed which is lower than the second speed. In a second arrangement wherein a level of the disk magazine placeable in either a horizontal or vertical posture is adjusted with respect to the inlet of an information reproducing section, where there is an adjustment of a level position of the disk magazine in a same direction as gravitational force, a spring force from the spring attached at an oblique angle between the disk magazine and a frame portion of the disk player, offsets a portion of the load imposed on the drive motor by gravitational force on the disk magazine; and, when in an opposite horizontal or vertical posture, a spring force from the spring adds to a load imposed on the drive motor.

12 Claims, 6 Drawing Sheets

MULTI-DISK DISK PLAYER HAVING MINIMALLY-SIZED MAGAZINE DRIVE MOTOR

FIELD OF THE INVENTION

The present invention relates to a disk player which is configured so that a plurality of disks are received in a magazine, a desired one of the disks is fed out from the magazine, and information recorded on the disk is reproduced. Further, the present invention relates to a disk player capable of providing a balanced magazine load while arranged in a horizontal posture or vertical posture.

BACKGROUND OF THE INVENTION

In recent years, a disk player of the type designed to receive a plurality of compact disks in a magazine, feed out a tray carrying a desired one of the disks from the magazine, and reproduce information recorded on the compact disk has been provided.

Figure 6:
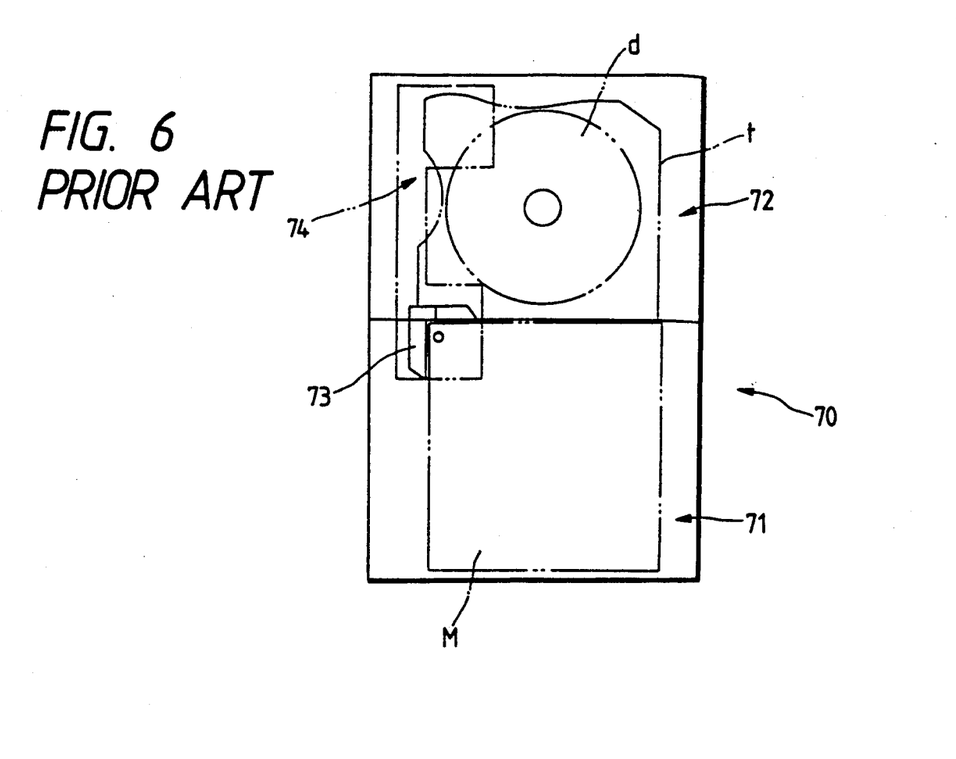
FIG. 6 is a plan view of a conventional disk player.

This type of disk player 70, as shown in FIG. 6, has a magazine reception portion 71 in which a magazine M for receiving the plurality of compact disks piled up therein is inserted, and an information reproducing portion 72 provided adjacently to the magazine reception portion 71 for reproducing information recorded on the desired compact disk d which is carried by a tray t fed out of the magazine M. A tray member 73 having the double purpose of turning the tray t out of the magazine M to feed the compact disk d to the information reproducing portion, and turning the tray t to return the disk d into the magazine M, is provided in the left side of the boundary of the magazine reception portion 71 and the information reproducing portion 72 in the drawing. The tray turning member 73 has two arms extending perpendicularly to each other. These arms are disposed to be opposite to each other as two perpendicular sides in a corner portion of the magazine M. The tray turning member 73 is provided so as to be freely turned by a tray turning mechanism 74 provided in the left side of the information reproducing portion 72 in the drawing.

Figure 7:
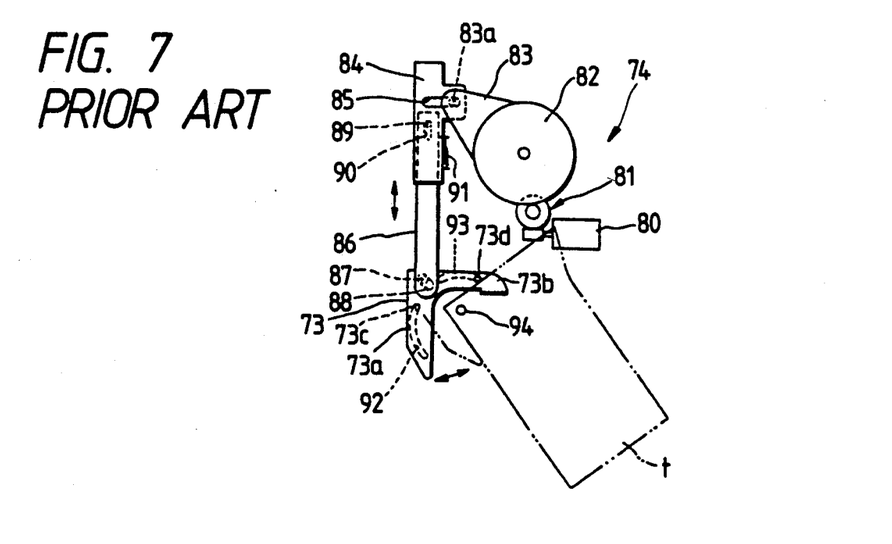
FIG. 7 is a view showing an example of a tray turning mechanism of the conventional disk player.

The tray turning mechanism 74, as shown in FIG. 7, has a reversible driving motor 80. The driving force of the driving motor 80 is transmitted to a rotary gear 82 through a gear mechanism 81. The rotary gear 82 has an arm 83 having its forward end connected to a first lever 84 through a pin 83a. The pin 83a is fitted into an elongated slot 85 formed in the first lever 84. A pin 89 is provided in the rear of the first lever 84 and fitted into an elongated slot 90 formed in a second lever 86. A tensile spring 91 is provided between the first and second levers 84 and 86. A pin 87 is provided at the forward end of the second lever 86 and fitted into an elongated slot 88 of the tray turning member 73. A pin 73c is provided in the rear of the first arm 73a of the tray turning member 73 and a pin 73d is provided in the rear of the second arm 73b thereof. The pin 73c is fitted into an elongated slot 92 provided in a frame not shown, and the pin 73d is fitted into an elongated slot 93.

When the driving motor 80 rotates, the rotary gear 82 rotates. With the rotation of the rotary gear 82, the arm 83 turns within a predetermined range. With the horizontal reciprocating motion of the arm 83 within the predetermined range, the first and second levers also perform a vertical reciprocating motion. With the reciprocating motion of the first and second levers 84 and 86, the tray turning member 73 turns clockwise and counterclockwise within a range of 90 degrees. The tray t in the magazine M is fed out to the information reproducing portion 72 by the counterclockwise turning of the tray turning member 73 in the drawing. On the contrary, the tray t in the information reproducing portion 72 is received into the magazine M by the clockwise turning of the tray turning member 73 in the drawing.

In the aforementioned tray turning mechanism 74, a relatively large quantity of force is required for operating a clicking mechanism provided at a pivotal point 94 between the magazine M and the tray t, and releasing the tray t in an early stage where the desired tray t is fed out of the magazine M. A large load is imposed on the driving motor 80. On the other hand, when the tray t thus fed out turns to a predetermined position and reaches a stopper, the reactive force of the stopper is transmitted into the second lever 86 through the tray and the tray turning member 73 thereby to expand the tensile spring 91. In short, the tensile spring 91 serves to absorb the reactive force imposed on the tray t when the tray reaches the predetermined stop position. Also, after the tray t is fed out into the information reproducing portion 72, the tensile spring 91 is expanded to press the tray t thereby to prevent the tray t from moving further because of influences such as external vibration and the like. Accordingly, a load which is larger than the load imposed on the driving motor 80 in the middle position within the range of turning of the tray t, is imposed on the driving motor 80 again.

In short, a load which is larger than the load imposed on the driving motor 80 in the middle position within the turning range of the tray t is imposed on the driving motor 80 both in an initial position and a final position when the desired tray t is fed out of the magazine M into the information reproducing portion 72. As a result of this larger load, there arises a problem in that not only the size of the driving motor 80 must be enlarged but the tray turning member 73 cannot be turned smoothly.

A second problem is also prevalent with current compact disk players, and such problem is most conveniently described with respect to a mobile compact disk player.

Figure 10:
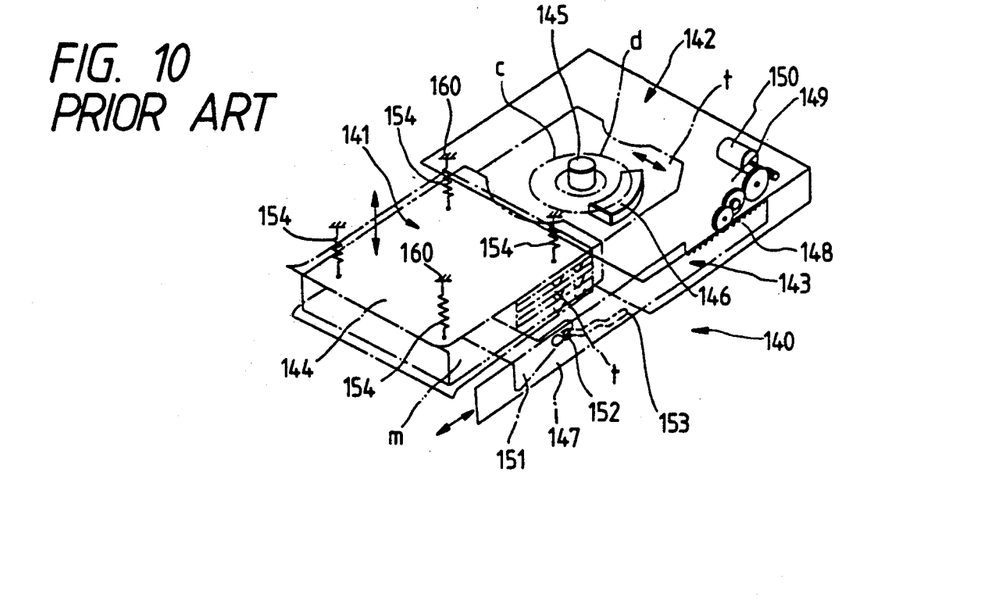
FIG. 10 is a schematic view showing the configuration of a conventional disk player.

In general, a mobile compact disk player is accommodated in a trunk of a car in which the player is placed in a horizontal or vertical posture (i.e., is mounted flat or standing on edge). As shown in FIG. 10, the conventional compact disk player has a magazine reception portion 141 for holding a magazine which can receive compact disks in a piled-up state therein, and an information reproducing portion 142 provided adjacently to the magazine reception portion for reproducing information of a selected disk supplied form the magazine reception portion. An upward and downward moving mechanism 143 for moving up and down the magazine reception portion 141 is provided on the side face of the disk player 140.

The magazine reception portion 141 has a frame 144 constituted by an upper plate and a lower plate, so that the magazine m is received within the frame 144, the information reproducing portion 142 has a spindle motor 145, a clamper c is provided under the spindle motor 145, and a pickup 146 is provided adjacently to the spindle motor 145 so that the pickup 146 is movable in the direction of a radius of the compact disk d.

The upward and downward moving mechanism 143 for moving up and down the magazine reception portion 141 has an operation plate 147. A gear-shaped portion 148 is provided at one end of the operation plate 147 so that a gear mechanism 149 is engaged with the gear-shaped portion 148. The gear mechanism 149 is rotated by a driving motor 150. An arm 151 is provided on the side of the frame 144 of the magazine reception portion 141 so as to be extended outwardly. A pin 152 is provided in the arm 151 and fitted into a stepping slot 153 formed in the operation plate 147.

A plurality of trays t piled up are received in the magazine m. The aforementioned compact disks d are carried in the trays t, respectively. To feed a compact disk d from the magazine m into the information reproducing portion 142, the magazine reception portion must be moved up and down to adjust a corresponding tray t having the desired compact disk d to an inlet of the information reproducing portion 142. Therefore, the driving motor 150 must be rotated to transmit the driving force of the driving motor 150 to the operation plate 147 through the gear mechanism 149, thereby to move the operation plate 147 so that the pin 152 provided in the arm 151 is moved within the stepping slot 153 in a manner corresponding to the movement of the operation plate 147. Accordingly, the magazine reception portion 141 is moved up and down corresponding to the movement of the pin 152 within the stepping slot.

In the case where the magazine reception portion 141 is moved up, gravity acts as an additional load on the reception portion 141 and the magazine m compared with the case where the reception portion 141 is moved down. Springs 154, 154, 154 and 154 are therefore provided on the upper plate of the frame 144 to reduce such additional gravitational load imposed on the driving motor 150. The upper ends of the respective springs 154 are fixed to a casing ceiling plate 160 of the disk player. The urging force of the springs 154 is established to be substantially equal to the weight of the magazine reception portion and the magazine m.

Figure 11:
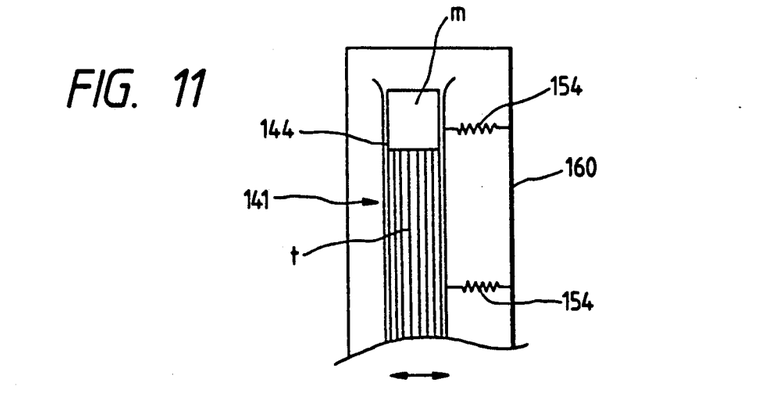
FIG. 11 is a view for explaining the operation of the conventional disk player of FIG. 10 in the case where the player is placed vertically.

In the case where the disk player 140 is used in a horizontal posture as shown in FIG. 10, the springs 154 urge the magazine reception position 141 to be pulled up against gravity. In this case, the additional gravitational load imposed on the driving motor 150 is balanced or reduced. However, the mobile compact disk player 140 may be used in a vertical posture (i.e., standing on end) as shown in FIG. 11. In the case where the player is used in a vertical posture, the spring force of the springs 154 is entirely loaded on the driving motor 150 when the magazine reception portion 141 is made to move left in FIG. 11. Therefore, the driving motor 150 must be increased in size.

In short, in the case where the disk player 140 is used in a horizontal posture as shown in FIG. 10, the load imposed on the driving motor 150 is reduced by the weight of the magazine reception portion 141 when the magazine reception portion 141 is made to move down. In the case where the disk player 140 is used in a vertical posture as shown in FIG. 11, the elastic force of the springs 154, however, entirely acts as an additional load when the magazine reception portion is made to move left in the drawing.

SUMMARY OF THE INVENTION

It is an object of the present invention to provide a disk player in which the size of the driving motor as a source for driving the tray turning mechanism can be reduced, and in which the tray can be smoothly moved out of and into the magazine.

According to the present invention, therefore, in a disk player configured so that a magazine, in which a plurality of disks are received therein in a piled-up state, is inserted into a magazine reception portion and a tray carrying a desired disk is fed by a tray turning mechanism from the magazine into an information reproducing portion provided with a pickup and so on, the tray turning mechanism including a tray turning member which is turnably provided in a corner portion of the magazine so as to move the tray in and out: the disk player is characterized in that the tray turning mechanism includes a cam gear rotated by a driving motor, a link for turning the tray turning member being connected to the cam gear through a cam slot formed in the cam gear so that rotating motion of the cam gear is converted into reciprocating motion by the link, the cam slot being configured so that the tray turning member is rotated at a low speed in an early stage where the tray is clicked out to be moved out of the magazine, the tray turning member is rotated at a high speed in a next stage, and the tray turning member is rotated at a low speed again in a last stage just before the tray is fed out to a predetermined position.

The cam gear and the link are provided between the driving motor and the tray turning member. Further, the cam slot has a structure in which the turning speed of the tray can be decreased both in the early stage and in the last stage when the tray is fed out of the magazine, and in which the turning speed of the tray can be increased in the middle position within the turning range of the tray. Accordingly, a substantially averaged load can be imposed on the driving motor in the whole turning range of the tray when the tray is fed out. Consequently, not only the size of the driving motor can be reduced, but the tray can be turned smoothly.

In addition to the above, with respect to the second, additional load problem, it is an object of the present invention to provide a disk player in which the load caused by an elastic member for suspending the magazine reception portion can be averaged so that no large load is imposed on the driving motor for moving up and down the magazine reception portion, though the disk player may be used in a vertical posture or in a horizontal posture.

Therefore, the present invention is configured so as to provide a disk player comprising a magazine reception portion for receiving a magazine holding a plurality of disks piled up in the magazine, and an information reproducing portion for reading, through a pickup means, information on a selected disk supplied from the magazine reception portion and for reproducing the information, so that the magazine reception portion and the information reproducing portion are moved relative to each other to arrange a desired disk in the magazine to be opposite to an inlet of the information reproducing portion. One of the magazine reception portion and the information reproducing portion is supported by an elastic member to reduce the load of a motor during the relative movement thereof against gravity, thereby to make it possible to change the placement of the disk player to various postures such as a vertical posture and a horizontal posture, characterized in that: the urging force of the elastic member is established so as to be a half of the force of gravity imposed on the magazine reception portion and the magazine m.

The magazine reception portion is suspended by the elastic member attached to a ceiling plate of a casing of the disk player, so that the magazine reception portion is pulled toward the ceiling plate of the casing by force which is the half of the force of gravity imposed on the magazine reception portion and the magazine m. When the urging force of the elastic member is established so as to be a half of the force of gravity imposed on the magazine reception portion and the magazine m as described above, the force for pulling up the magazine reception portion can be reduced in the case where the disk player is used in a horizontal posture, because the urging force of the elastic member is equal to one-half the force of gravity imposed on the magazine reception portion and the magazine m. Furthermore, in the case where the magazine reception portion is used in a vertical posture, the load imposed on the magazine reception portion driving motor by the elastic force of the elastic member can be reduced when the magazine reception portion is made to move in the direction opposite to the ceiling plate of the casing.

BRIEF DESCRIPTION OF THE PREFERRED EMBODIMENT OF THE INVENTION

An embodiment of the present invention will be described hereunder with reference to the drawings.

Figure 1:
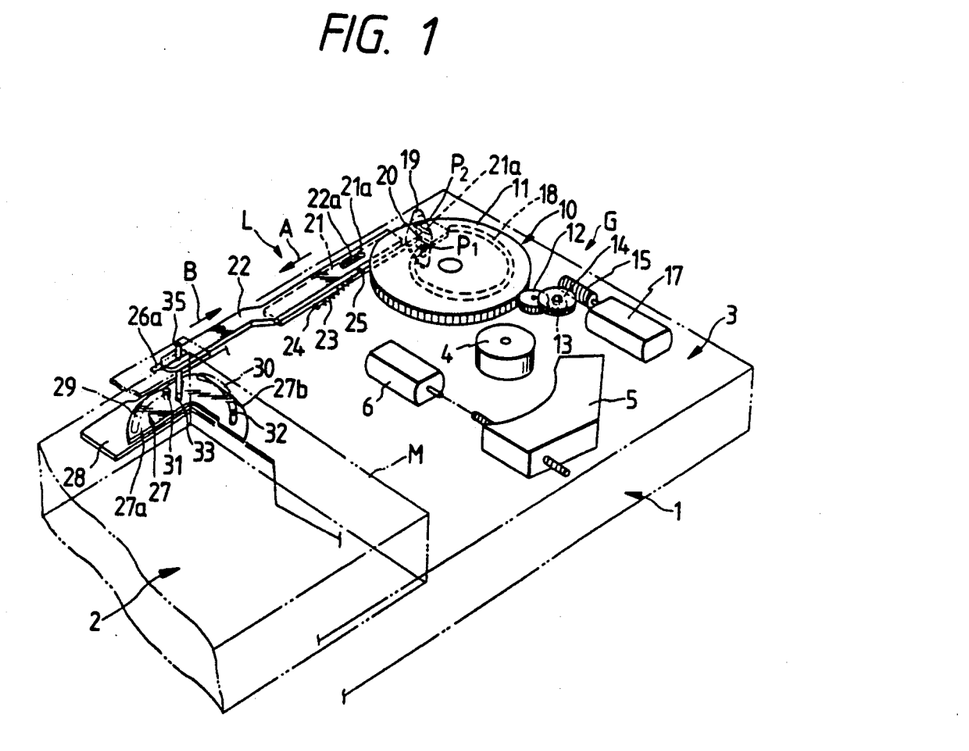
FIG. 1 is a schematic perspective view of a disk player according to the present invention.
Figure 2:
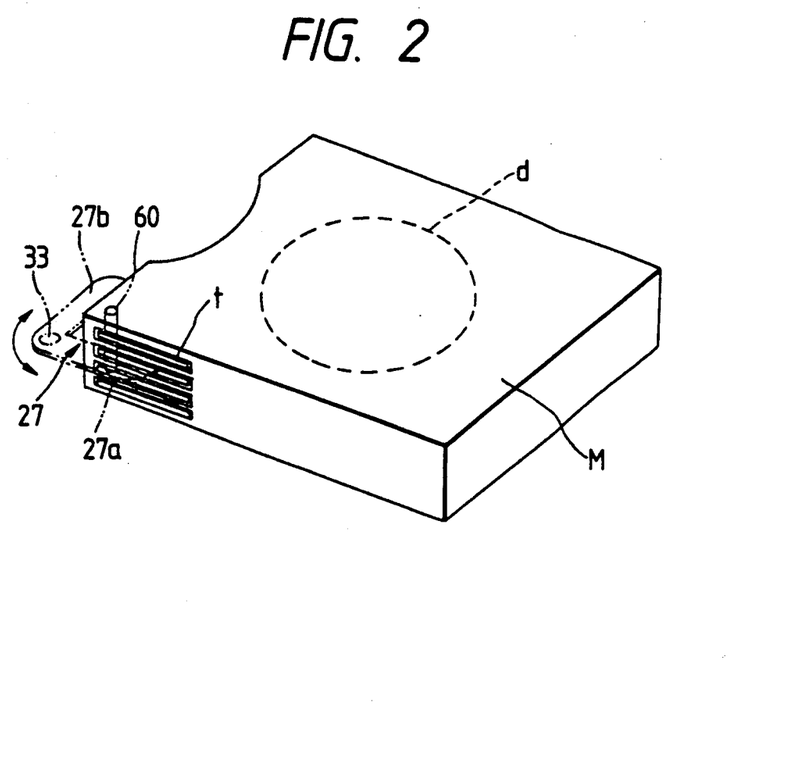
FIG. 2 is a view for explaining the positional relation between the magazine and the tray turning member.

In FIGS. 1 and 2, the disk player 1 of the invention has a magazine reception portion 2 for receiving a magazine M therein, and an information reproducing portion 3 provided adjacently to the magazine reception portion 2. A plurality of trays t piled up as shown in FIG. 2 are received in the magazine M. Compact disk d are received in the middle portions of the trays t, respectively. The information reproducing portion 3 has a spindle motor 4 in its middle portion. A pickup 5 is provided adjacently to the spindle motor 4. The pickup 5 slides in the direction of a radius of a desired compact disk d by the driving motor 6, to read information recorded on the compact disk d inserted in the information reproducing portion 3. A tray turning mechanism 10 is provided along two perpendicular sides of the information reproducing portion 3. The tray turning mechanism 10 has a large-diameter cam gear 11 provided in a corner portion of the information reproducing portion 3. A gear is formed in the vicinity of the large-diameter cam gear. A reversible driving motor 17 is linked with this gear through the gear mechanism G. The gear mechanism G has a first gear 12 which is engaged with the gear formed in the outside of the cam gear 11 and which is further engaged with a second gear 13. The second gear 13 turns together with a third gear 14, with the second and third gear being provided coaxially and secured to each other as a single unit. The third gear 14 is engaged with a worm gear 15 which is mounted onto the rotary shaft of the driving motor 17. The driving motor 17 is a reversible motor so that the driving motor 17 makes the cam gear 11 rotate clockwise and counterclockwise.

A cam slot 18 is formed in the rear of the cam gear 11. One end of an arm 19 is fitted into the cam slot 18 through a pin $P_1$. The arm 19 is turnable around a shaft 20 attached to the frame. A pin $P_2$ is provided in the opposite end portion of the arm. The arm 19 is linked, through the pin $P_2$, with a first lever 21 which forms a part of a link mechanism L. The pin $P_2$ is fitted into an elongated slot 34 which is formed in the forward end of the first lever 21 and extends transversely.

The forward end portion of a second lever 22 is overlapped on the first lever 21. An elongated slot 22a is provided in the forward end portion of the second lever 22. The pin 21a attached onto the first lever 21 is fitted into the elongated slot 22a. A tensile spring 23 is provided between the second lever 22 and the first lever 21, under the second lever 22. The forward end portion of the tensile spring 23 is attached to a pin 25 which is formed on the side face of the second lever 22 so as to vertically project from the second lever 22. On the other hand, the rear end of the tensile spring 23 is attached to a pin 24 which is formed in a side of the first lever 21 so as to project from the first lever 21. Accordingly, the second lever 22 is urged by the tensile spring 23 to be pulled in the direction of the arrow A in the drawing.

The pin 35, extending vertically, is provided in the rear end portion of the second lever 22. The upper portion of the pin 35 is fitted into an elongated slot 26a provided in the frame 26 so as to be guided, and the lower portion of the pin 35 is fitted into an elongated slot 33 of a tray turning member 27 provided along the front left corner portion of the magazine M received in the magazine reception portion 2. The tray turning member 27, which is shaped like a sickle, has an arm 27a extending along the side surface of the magazine M, and an arm 27b extending along the front surface of the magazine M.

As shown in FIG. 2, the arm 27a of the tray turning member is disposed opposite to a portion of trays t projecting from opening portions formed in the forward end portion of the side surface of the magazine M, and the arm 27b thereof is disposed opposite to the front surface of the trays piled up in the magazine M.

A pin 31 projects downward from the arm 27a, and a pin 32 projects from the arm 27b. The pin 31 is fitted into an arc-shaped slot 29 formed in a frame 28, and the pin 32 is fitted into an arc-shaped slot 30. The tray turning member 27 is provided so as to be turnable within a range of 90 degrees. The turning range is limited by the arc-shaped slots 29 and 30.

Figure 3:
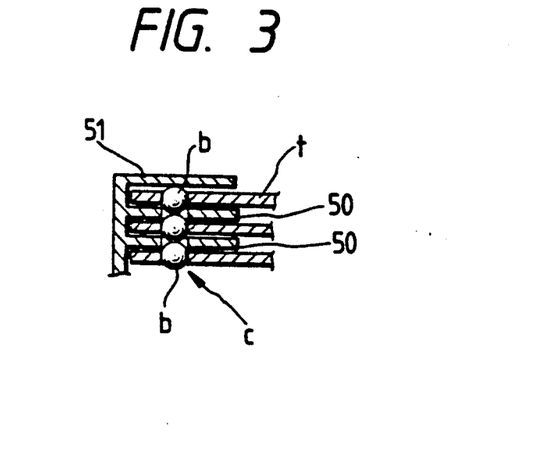
FIG. 3 is a sectional view of the clicking mechanism for the magazine.

In the case where the tray turning member 27 turns counterclockwise in the drawing, the tray t opposite to the arm 27a turns around a pivot 60 attached onto the corner portion of the magazine M and stops when the tray t is fed out to reach a predetermined position within the information reproducing portion 3. In the case where the tray turning member 27 turns clockwise in the drawing, the tray t which has been fed out into the information reproducing portion 3 is returned into the magazine M. A clicking mechanism C as shown in FIG. 3 is provided in the vicinity of the pivot 60. In short, trays t are turnably received between the outer and separation walls 50 of the magazine M under the condition that balls b are vertically continuously received in opening portions of the trays t and the separation walls 50. When a desired tray t is to be turned, a corresponding ball b is removed from the opening portion of the tray t, thereby to make it possible to feed one of the trays t out of the magazine M.

The magazine M further has a clicking mechanism operated by a spring (not shown), so that the tray t is urged to move toward the reception position thereby to prevent the tray t from stopping in a position where the tray t only slightly moves out of the magazine M.

Figure 4:
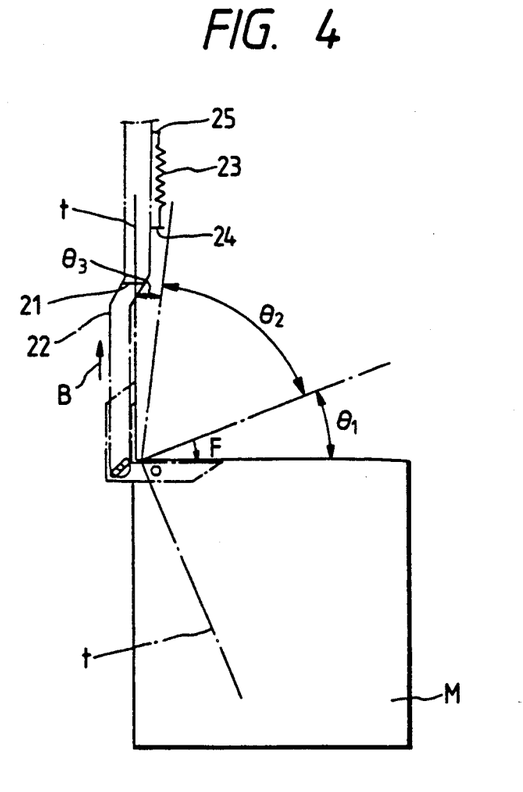
FIG. 4 is a view for explaining the relation between the turning range of the tray and the tray turning mechanism.

When the tray turning member 27 rotates by 90 degrees from the condition shown in FIG. 1, and, accordingly, when the tray t turns to a predetermined position of the information reproducing portion, the tray t is stopped as shown in FIG. 4 by a stopper (not shown). At this time, the reactive force of the stopper is transmitted into the second lever 22 through the arm 27a of the tray turning member 27. After the tray t strikes the stopper, the tray t is still urged by tensile spring 23 to remain stationary despite influences such as external vibration and the like. Accordingly, the tray turning mechanism further turns to move the first lever 21 slightly in the direction of the arrow A in FIG. 4 and stops in the condition that the tensile spring 23 is expanded.

In short, a relatively large quantity of force is required for turning a tray t both in a range of angle $\theta_1$ where the tray t in an initial state in the magazine M to overcome the clicking mechanism C shown in FIG. 3 and the clicking spring (not shown), and in a range of angle $\theta_3$ where the desired tray t is stopping in the predetermined position within the information reproducing portion 3, when such initial and final forces are compared with an intermediate force required within a range of angle $\theta_2$ between the aforementioned ranges.

Figure 5:
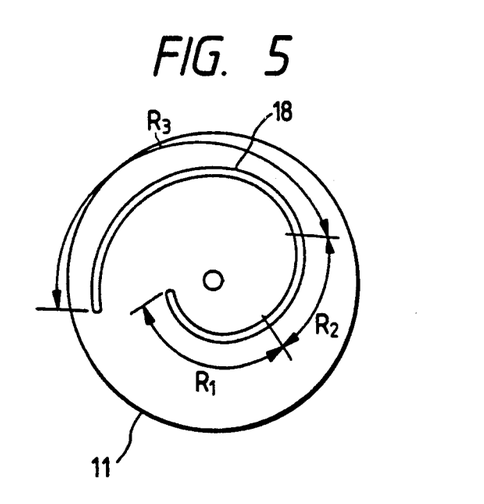
FIG. 5 is a plan view of the cam gear.

Therefore, in the present invention, the cam slot 18, having a special form as shown in FIG. 5, is formed in the rear of the cam gear 11. The cam slot 18 is separated into three regions $R_1$, $R_2$ and $R_3$. The region $R_1$ is relatively near the center of the cam gear 11, the region $R_2$ extends from the vicinity of the center of the cam gear 11 to the vicinity of the external circumference of the cam gear 11, and the region $R_3$ is connected to the region $R_2$ and extends substantially along the external circumference of the cam gear 11 in the vicinity of the external circumference of the cam gear 11. The regions $R_1$, $R_2$ and $R_3$ correspond to the angles $\theta_1$, $\theta_2$ and $\theta_3$ in FIG. 4, respectively.

In short, when the pin $P_1$ of the arm 19 moves along the region $R_1$, the link L moves slowly in the direction of the arrow A (FIG. 1). When the pin $P_1$ moves along the region $R_2$, the link L moves rapidly in the direction of the arrow A. Finally, when the pin $P_1$ moves along the region $R_3$, the link L moves slowly in the direction of the arrow A. The tray turning member 27 turns at a speed corresponding to the movement of the link L in the direction of the arrow A. According to such arrangement, when the tray t is released from the clicking mechanism C and the clicking spring (now shown), the tray t turns relatively slowly. After the tray t is released from the clicking mechanism, the tray t turns at a high speed. Then, the tray t turns slowly again in the last stage of the turning of the tray t. When the tray t, the tray turning member 27 and the link L are operated as described above, the load imposed on the driving motor 17 is averaged in the whole range of the turning of the tray. Furthermore, such components are rotated rapidly in the range of the intermediate turning angle $\theta_2$ of the tray t. Accordingly, the total turning time of the tray t is not elongated.

According to the present invention configured as described above, not only the operation of feeding out a tray t can be carried out smoothly when the tray t in the magazine M is fed out into the information reproducing portion, but also the load imposed on the driving motor is averaged in the whole turning range of the tray with no elongation of the time required for feeding out the tray t. Accordingly, the invention has an effect in that not only the lifetime of the driving motor can be prolonged but the size of the driving motor can be reduced.

An embodiment of the present invention to compensate or eliminate the aforementioned second, additional load problem will be described hereunder with reference to the drawings.

Figure 8:
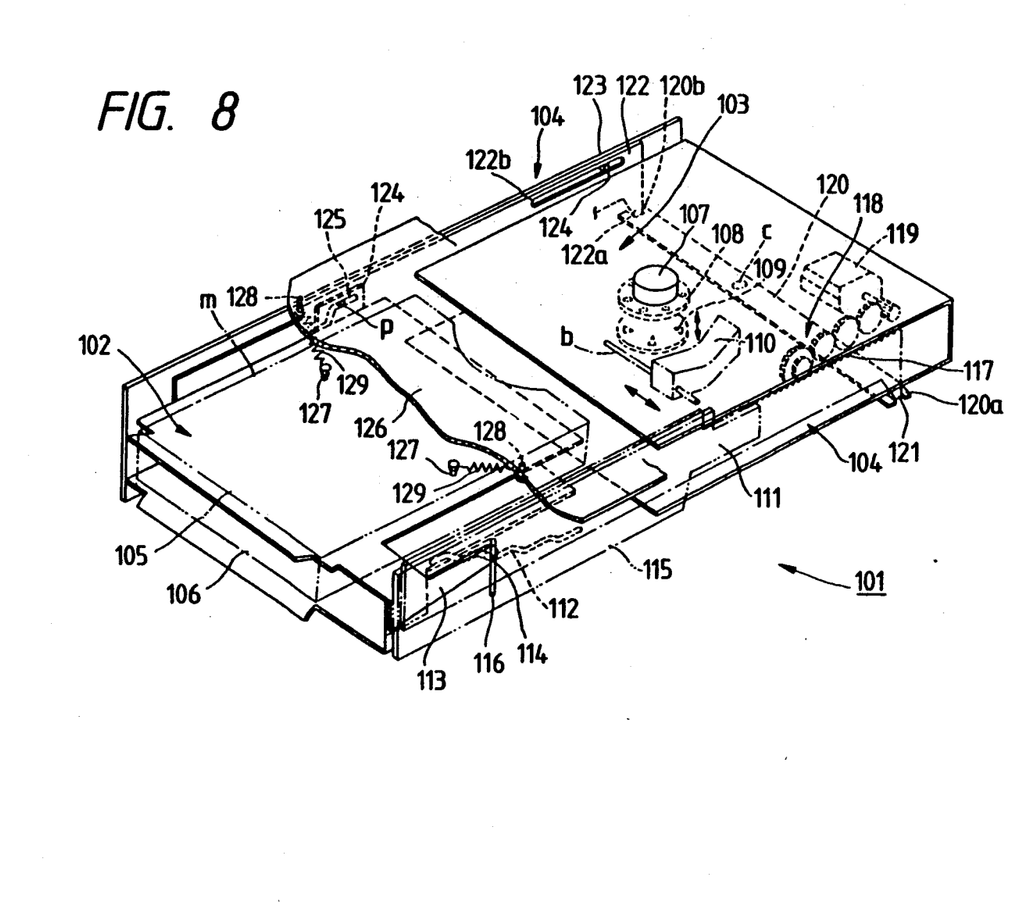
FIG. 8 is a schematic view showing the configuration of the disk player according to another embodiment of the present invention.

In FIG. 8, the disk player 101 of the invention has a magazine reception portion 102 for holding a magazine m for receiving a plurality of compact disks piled up in the magazine, and an information reproducing portion 103 provided adjacently to the magazine reception portion 102 and for reading information of a selected disk supplied from the magazine m. An upward and downward moving mechanism 104 for moving up and down the magazine reception portion 102 is provided on the side face of the disk player 101. The magazine reception portion 102 has an upper frame 105 and a lower frame 106, so that the magazine m is received between the frames 105 and 106.

A spindle motor 107 for rotating the compact disk is provided substantially in the middle of the information reproducing portion 103. Clamper 108 and 109 for clamping the compact disk supplied from the magazine reception portion 102 are provided under the spindle motor 107 so that the compact disk is clamped between the clampers 108 and 109. A pickup 110 is provided adjacently to the spindle motor 107 so that the pickup 110 can be moved along the guide bar b in the direction of a radius of the compact disk d by a diving motor not shown.

Side frames 115 and 123 are provided at opposite sides of the disk player 101, respectively. A main operation plate 111 is provided to be slidable along the inner side of the side frame 115. An auxiliary operation frame 122 is provided along the inner side of the other side frame 123. A stepping slot 112 is formed in a portion of the main operation plate 111 which is opposite to the magazine reception portion 102. A pin 114 is fitted into the stepping slot 112 and attached to the forward end of an arm 113. The arm 113 is extended transversely from the side of the upper plate 105 of the magazine reception portion 102. Not only the pin 114 is fitted into the stepping slot 112 but the pin 114 is fitted into a vertical slot 116 provided in the side frame 115. A gear-shaped portion 117 is provided in the front of the operation plate 111 so that a gear mechanism 118 is engaged with the gear-shaped portion 117. The gear mechanism 118 is rotated by a driving motor 119. The operation plate 111 is slid forward and backward along the side frame 115 by the operation of the driving motor 119, so that the stepping slot 112 is moved transversely with the sliding of the operation plate 111. Accordingly, the pin 114 fitted into the stepping slot 112 and attached to the arm 113, is moved up and down along the vertical slot 116. Consequently, the magazine reception portion 102 is moved up and down with the sliding of the operation plate 111.

An engagement/stoppage projection 121 is provided at a front end lower portion of the operation plate 111, so that an engagement/stoppage portion 120a of a lever 120 is engaged with the engagement/stoppage projection 121. The lever 120 is provided so as to be rotatable around a center pin c in its middle portion. Another engagement/stoppage portion 120b is formed in the opposite end portion of the lever 120 so that an engagement/stoppage projection 122a at a front end lower portion of the auxiliary operation plate 122 is engaged with the engagement/stoppage portion 120b. The auxiliary operation plate 122 has a horizontal slot 122b so that a pin 124 attached to the side frame 123 is fitted into the horizontal slot 122b. A stepping slot 125 is formed in the auxiliary operation plate 12 in the same manner as the stepping slot 112, except that the stepping slot 125 is formed reversely to the stepping slot 112 formed in the main operation plate 111. The sliding operation of the main operation plate 111 is transmitted to the auxiliary operation plate 122 through the lever 120, but the main and auxiliary operation plates 111 and 122 are moved in directions opposite to each other. Therefore, the stepping slots 112 and 125 are formed reversely to each other Accordingly, the magazine reception portion 102 is moved up and down while being kept in a horizontal posture. A pin P fitted into the stepping slot 125 is fixed to a rising side 124 formed on the side face of the upper plate 105 of the magazine reception portion 102.

In the following, the subject of the present invention is described.

A pair of coiled springs 129 and 129 are provided between the upper plate 105 of the magazine reception portion 102 and the casing ceiling plate 126 of the disk player 101. One end of each of the coiled springs 129 is attached to the upper plate 105 through a pin 127, and the other end thereof is attached to a pin 128 hung down from the casing ceiling plate 126. The pair of coiled springs 129 serve as tensile springs which extend horizontally and obliquely to pull up the upper plate 105 of the magazine reception portion toward the frame ceiling plate 126.

Figure 9:
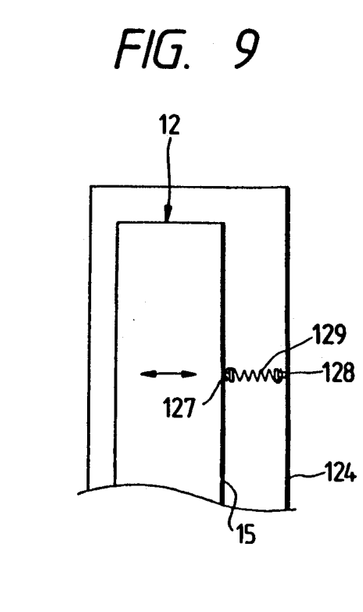
FIG. 9 is a view for explaining the operation of the embodiment of FIG. 8 in the case where the disk player is placed vertically.

FIG. 9 shows the case where the disk player 101 is placed horizontally. In this case, the pulling-up force of the coiled springs 129 as an elastic member acts to reduce the load of gravity imposed on the driving motor to half when the driving motor 119 is rotated to move up the magazine reception portion 102. Furthermore, when the magazine reception portion 102 is to be moved down, the magazine reception portion 102 is moved down smoothly because of its self weight so that the load imposed on the driving motor 119 becomes small.

On the other hand, in the case where the disk player is placed vertically, the load imposed on the driving motor 119 is reduced by the elastic force of the coiled springs 129 when the magazine reception portion 102 is moved toward the ceiling plate 126 as shown in FIG. 9. On the contrary, when the magazine reception portion 102 is to be moved to the left in the drawing, the driving motor 119 is rotated against the tensile force of the coiled springs 129. The elastic force of the coiled springs corresponding to the half of the self weight of the magazine reception portion and the magazine m is loaded on the driving motor 119 but the force is reduced to half compared with the prior art. In short, the tensile springs 129 are provided obliquely at an angle to satisfy the aforementioned relationship.

When the coiled springs 129 having urging force corresponding to the half of the self weight of the magazine reception portion and the magazine m are provided between the ceiling plate 126 and the upper plate 105 of the magazine reception portion as described above, the load imposed on the driving motor is averaged to prevent the excessive load on the driving motor regardless of the horizontal or vertical position of the disk player.

The springs may be attached onto the information reproducing portion 103 in the case where the information reproducing portion 103 is designed to be moved up and down.

According to the present invention configured as described above, the difference between loads imposed on the driving motor for moving the magazine reception portion because of a change in the horizontal or vertical posture of the disk player can be reduced. Consequently, the invention has an effect in that the maximum load imposed on the driving motor can be reduced.

What is claimed is:

1. A disk player having reduced size drive motor means, said disk player comprising:
    disk magazine means for holding a plurality of disks for selectable delivery to an information reproducing section of said disk player;
    movement means including member means and drive motor means for moving disk magazine means to accommodate delivery of a selected disk of said plurality of disks to said information reproducing section; and
    compensating means for compensating for variations in load which said disk magazine means places on said drive motor means as a result of differing movements of said disk magazine means, such that variations in load induced by movements of said disk magazine means are averaged and a reduced size drive motor means can be used in said disk player.

2. A disk player as claimed in claim 1, wherein said compensating means includes cam gear means having cam slot means for providing said compensating for variations in load.

3. A disk player having reduced size drive motor means, said disk player comprising:
    disk magazine means for holding a plurality of disks for selectable delivery to an information reproducing section of said disk player;
    movement means including member means and drive motor means for moving said disk magazine means to accommodate delivery of a selected disk of said plurality of disks to said information reproducing section; and
    compensating means for compensating for variations in load which said disk magazine means places on said drive motor means as a result of differing movements of said disk magazine means, such that variations in load induced by movements of said disk magazine means are averaged and a reduced size drive motor means can be used in said disk player;

wherein said compensating means includes cam gear means having cam slot means for providing said compensating for variations in load, and said cam slot means is of a predetermined spiral configuration.

4. A disk player as claimed in claim 3, wherein said cam slot means receives driving force from said drive motor means, and wherein a middle portion of said cam slot is utilized to translate said driving force into an intermediate-range force of predetermined torque/speed and apply the same to said member means, and initial and final portions of said cam slot are utilized to translate said driving force into an end-range force of predetermined torque/speed which is higher in torque and lower in speed than that of said intermediate-range force, and to apply the same to said member means.

5. A disk player as claimed in claim 4, wherein said movement means further includes disk rotation means for rotating a selected tray portion of said disk magazine means for delivery of a selected disk to said information reproducing section, and wherein: an end-range force from said initial portion of said cam slot causes said selected tray portion to rotate at a first speed; an intermediate-range force from said middle portion of said cam slot causes said selected tray portion to rotate at a second speed which is higher than said first speed; and, an end-range force from said final portion of said cam slot causes said selected tray portion to rotate at a third speed which is lower than said second speed.

6. A disk player as claimed in claim 1, wherein said movement means is for adjusting a position of said disk magazine means with respect to said information reproducing section to adjust the alignment of a selected disk of said plurality of disks with an inlet of said information reproducing section, and wherein said compensating means includes spring means attached between said disk magazine means and a frame portion of said disks player, and having a spring force equal to at least a portion of, but less than a total of, a gravitational force on said disk magazine means.

7. A disk player as claimed in claim 6, wherein: when said disk player is arranged in one of a horizontal and vertical posture where said movement means adjusts a position of said disk magazine means in a same direction as gravitational force, a spring force from said spring means offsets a portion of the load imposed on said drive motor means by said gravitational force on said disk magazine means; and, when in an opposite one of said horizontal and vertical posture, a spring force from said spring means adds to a load imposed on said drive motor means.

8. A disk player as claimed in claim 7, wherein as spring force of said spring means is equal to at least one-third, but less than three-fourths, of a gravitational force on said disk magazine means.

9. A disk player as claimed in claim 8, wherein a spring force of said spring means is equal to one-half of a gravitational force on said disk magazine means.

10. A disk player as claimed in claim 7, wherein said spring means is attached between said disk magazine means and said frame portion at an angle which is oblique to at least one of a main surface of said disk magazine means and said frame portion, to which said spring means is attached.

11. A disk player as claimed in claim 8, wherein said spring means is attached between said disk magazine means and said frame portion at an angle which is oblique to at least one of a main surface of said disk magazine means and said frame portion, to which said spring means is attached.

12. A disk player as claimed in claim 9, wherein said spring means is attached between said disk magazine means and said frame portion at an angle which is oblique to at least one of a main surface of said disk magazine means and said frame portion, to which said spring means is attached.

* * * * *